(12) United States Patent
Bailey (10) Patent No.: US 10,713,386 B2
(45) Date of Patent: Jul. 14, 2020

(54) METHOD AND SYSTEM FOR PROTECTING USER PRIVACY

(71) Applicant: Christian Bailey, Lexington, MA (US)

(72) Inventor: Christian Bailey, Lexington, MA (US)

(73) Assignee: Arrive Group, Inc., Lexington, MA (US)

( * ) Notice: Subject to any disclaimer, the term of this patent is extended or adjusted under 35 U.S.C. 154(b) by 0 days.

(21) Appl. No.: 16/532,330

(22) Filed: Aug. 5, 2019

(65) Prior Publication Data

US 2020/0042742 A1 Feb. 6, 2020

Related U.S. Application Data (60) Provisional application No. 62/768,382, filed on Nov. 16, 2018, provisional application No. 62/714,771, filed on Aug. 6, 2018.

(51) Int. Cl.
| | | |
|---|---|---|
| *G06F 21/31* | (2013.01) | |
| *G06F 21/62* | (2013.01) | |
| *G06Q 50/00* | (2012.01) | |
| *G06F 16/9535* | (2019.01) | |

(52) U.S. Cl.
CPC ...... *G06F 21/6254* (2013.01); *G06F 16/9535* (2019.01); *G06Q 50/01* (2013.01)

(58) Field of Classification Search
CPC .................................................. G06F 21/316
See application file for complete search history.

(56) References Cited

U.S. PATENT DOCUMENTS

| | | | |
|---|---|---|---|
| 6,618,593 B1 * | 9/2003 | Drutman | G08B 21/0222 455/456.3 |
| 6,662,014 B1 | 12/2003 | Walsh | |
| 6,774,840 B1 | 8/2004 | Adamczyk | |
| 6,885,874 B2 | 4/2005 | Grube | |
| 7,284,033 B2 | 10/2007 | Jhanji | |
| 7,353,034 B2 | 4/2008 | Haney | |
| 7,627,331 B2 | 12/2009 | Winterbottom | |
| 8,000,726 B2 | 8/2011 | Altman | |
| 8,005,911 B2 | 8/2011 | Jhanji | |
| 8,050,690 B2 | 11/2011 | Neeraj | |

(Continued)

OTHER PUBLICATIONS

Josh Constine; The quest to cure loneliness; [online]; Jun. 10, 2016; https://techcrunch.com/2016/06/10/come-together/.

(Continued)

*Primary Examiner* — William S Powers (57) ABSTRACT

A method and system which shows a user contacts that are nearby but protects those contacts' privacy by mixing indistinguishably into the list contacts that are not nearby thus creating an obfuscated list such that user is unable to identify which contacts are nearby and which are not nearby. The user selects contacts the user would want to see if they were nearby. If the user selects a contact who is actually nearby, the system then protects the user's privacy by presenting another obfuscated list to the selected contact. The system discloses proximity only after two users have each mutually selected each other. The system may more broadly be used by showing the user contacts that have any form of matching personal data while still protecting all users' privacy with obfuscated lists until two users have each mutually selected each other.

17 Claims, 6 Drawing Sheets

(56) References Cited

U.S. PATENT DOCUMENTS

| | | |
|---|---|---|
| 8,284,748 B2 | 10/2012 | Borghei |
| 8,400,946 B2 | 3/2013 | Bloebaum |
| 8,417,262 B2 | 4/2013 | Loeb |
| 8,613,109 B2 | 12/2013 | Janoulis |
| 8,855,665 B2 | 10/2014 | Buford |
| 8,914,043 B2 | 12/2014 | Zelinka |
| 8,958,830 B2 | 2/2015 | Chawla |
| 8,989,778 B2 | 3/2015 | Altman |
| 9,031,583 B2 | 5/2015 | Pereira |
| 9,319,876 B2 | 4/2016 | Arunkumar |
| 10,007,941 B1 | 6/2018 | Liu |
| 10,375,519 B2 | 8/2019 | Pai |
| 10,380,664 B2 | 8/2019 | Trussel |
| 10,382,378 B2 | 8/2019 | Garcia |
| 2002/0178163 A1* | 11/2002 | Mayer .................. G06F 16/951 |
| 2004/0215793 A1* | 10/2004 | Ryan ...................... G06Q 50/01 |
| | | 709/229 |
| 2007/0032240 A1* | 2/2007 | Finnegan ................ H04W 4/21 |
| | | 455/445 |
| 2018/0047070 A1* | 2/2018 | Koenig ............. G06Q 30/0282 |

OTHER PUBLICATIONS

Dani Deahl; Snapchat's newest feature is also its biggest privacy threat; [online]; Jun. 23, 2017; https://www.theverge.com/2017/6/23/15864552/snapchat-snap-map-privacy-threat.

Brian X. Chen; When You Should (and Shouldn't) Share Your Location Using a Smartphone; [online]; Jul. 12, 2017; https://www.nytimes.com/2017/07/12/technology/personaltech/using-location-sharing-apps.html.

Shilpi Chakravarty; Location data sharing: What are the concerns around privacy?; [online]; Mar. 5, 2018; https://www.geospatialworld.net/blogs/is-your-location-data-safe/.

Josh Constine; Facebook tests Snap Map-style redesign of Nearby Friends; [online]; Oct. 3, 2018; https://techcrunch.com/2018/10/03/facebook-nearby-map/.

* cited by examiner

METHOD AND SYSTEM FOR PROTECTING USER PRIVACY

CROSS-REFERENCE TO RELATED APPLICATIONS

This application claims priority to and the benefit of provisional patent applications Ser. No. 62/768,382 filed 2018 Nov. 16 and Ser. No. 62/714,771 filed 2018 Aug. 6 by the present inventor, which are incorporated by reference in their entirety.

FEDERALLY SPONSORED RESEARCH

Nonapplicable.

BACKGROUND

Personal location data is valuable to facilitating human interactions and thus to social networking and communications services. For example, a service which lets you know when your friends are nearby would be valuable to many people. If you land in another city for a meeting, you may enjoy dining with a close friend who also happens to be visiting the city, rather than dine alone. Yet privacy concerns mean most people are reluctant to share location data freely. Thus, even though some mobile apps (e.g., Apple's Find Friends) already have the functionality to see where friends are located, the privacy cost of always-on location sharing is so high that most iPhone users do not share their location through the app and those who do share with only a very small number of close friends and family.

Likewise, a service which lets you know when your friends are conveniently available for an audio call or videoconference would be valuable to many people. For instance, while driving to work, it would be desirable to have a phone conversation with a friend or work contact who also happens to be stuck in a car and thus is conveniently available. But nobody has been able to develop a widely-adopted service which reports what your friends, family, or work contacts happen to be doing and whether they are available at the same time you are because privacy concerns mean most people are reluctant to share their availability status freely. More generally, it may be valuable to know when other people have any matching personal data, such as political affiliation, sexual orientation, or unusual interests.

In addition to the "always on" personal data sharing services such as Apple's Find Friends, there are also "single opt-in" services. For example, a user can choose to broadcast their location by posting a message or photo, or "checking in" on a social network, knowing that the post will be seen by many of their friends through the social network. The drawbacks in using these services to solve the location sharing problem are 1) that they require effort on the part of the user to remember to create and then to create the post, and many users are too busy to remember to take the time to create the post, 2) many users feel that posting about travel is "showing off" and so avoid doing in spite of the benefit of potentially meeting other friends there, 3) users of social networks may perceive that those who do post their travel are over-sharing and are thus socially less desirable, 4) such posts require affirmative effort and many users would only use a service that is more automatic, and 5) such posts may lead to awkwardness if a contact sees it and responds that they would like to meet up, but the user of the original post would rather not meet that contact.

There further exist "double opt-in" services such as dating apps that only establish connection for messaging between two users who have selected each other. Some dating apps offer to match users with a selection of other users within geographic proximity and with whom they are already connected through social networks. However, these do not solve the problem of connecting with friends and business acquaintances, because there is no feature to monitor connected users' location and notify a user when one of their connections becomes geographically proximate. Worse, these apps have a more serious drawback in that they do not protect privacy. That is because, when a user uses a geographic filter, that user knows any other user displayed by the app is certainly nearby.

The significant interest that individuals have to know when their friends, family, business contacts, and other contacts are nearby and to facilitate convenient meetings, together with the fact that none of the foregoing apps and other technology solutions have taken off due to privacy concerns demonstrates the long-felt need for a privacy-protecting solution. In addition, the significant benefit from being able to reach friends, family, business contacts, and other contacts at a mutually-convenient time demonstrates the long-felt need for a privacy-protecting solution for sharing personal data more generally. There has not yet been a technology solution to address the aforementioned shortcomings of conventional personal data sharing services. I have found that the technology problem to be solved is to find a means to share and match on personal data while protecting users' privacy.

SUMMARY

There is a need for a tool which would allow for the communications and connectivity value from discovering contacts with matching personal data, yet without: reducing privacy, requiring specific actions by users to initiate, generating negative social perceptions, or creating awkwardness around rejection. Embodiments of the invention provide a powerful tool that solves this long-felt need and are applicable in numerous applications including travel, social networking, locating friends, finding dining companions, staying connected with existing contacts, maintaining professional networks, scheduling work calls, finding friends who are available for virtual reality connections, and spending more in-person time with friends who really matter to us. Embodiments of the invention are directed toward further solutions to address this need, in addition to having other desirable characteristics.

Embodiments of the invention involve using a communication system of a plurality of computing devices equipped with network interfaces communicatively coupled to each other or a server to identify users who are connected; receive updates of personal data of the users; detect, by processing the updates, that a first user has matching personal data, wherein first user's personal data matches to a predetermined extent the personal data of one or more users connected to the first user; present to the first user a first list of users connected to the first user comprising one or more connected users with matching personal data and one or more connected users without matching personal data; receive from the first user a selection of all users on the first list of users to whom the first user is willing to disclose the matching personal data; identify a selected user comprising a user who is part of the selection of the first user and has matching personal data to the first user; present to the selected user a second list of users from the group comprising the first user, users connected to the selected user with matching personal data, and users connected to the selected user without matching personal data; receive from the selected user a selection of all users on the second list of users to whom the selected user is willing to disclose the matching personal data; identify mutually-matched users comprising a plurality of users who have all selected each other; and inform the mutually-matched users of the matching personal data and the identity of the mutually-matched users with a notification. Thus, a user is able to discover connected users with matching personal data without giving up privacy.

In another embodiment of the invention, updates of personal data of the users are received from, and the notifications are delivered to, mobile devices equipped with network interfaces communicatively coupled to each other or a server. The process may be repeated iteratively based upon updated the personal data received from the mobile devices of the users received at the server.

In another embodiment of the invention, the notifications comprise one or more of the group comprising an electronic message, text message, email, a notification to open an application a notification to open a webpage, sent to the one or more selected users by way of a wireless communication protocol.

In another embodiment of the invention, the personal data comprises one or more of the group comprising geographic location information, availability to have a conversation, and any information that a user would prefer to share only selectively. Whether the geographic location information matches to a predetermined extent may be specified by one of the group comprising user input, input from a user-selectable geographic radius, an algorithm determining relative proximity thresholds between users, latitude and longitude obtained from a geocoding algorithm, a predefined distance from an address of an area, a predefined distance from a geographic location associated with an area using latitude and longitude, and a geometric perimeter of geographic area.

In another embodiment of the invention, the communication system predicts personal data of the users which will in the future match to a predetermined extent by accessing one or more of the group comprising calendars, email, a database of contact activity, social media activity, location data, and mobile device sensor data.

In another embodiment of the invention, the communication system identifies users who are connected by processing one or more of the group comprising address books, contact lists, social networks, memberships, affiliations, qualifications, certifications, events attended, locations visited, and institutions attended.

In another embodiment of the invention, the first list of users and the second list of users comprises one or more of the group comprising a list of membership groups wherein at least one member's personal data matches that of the first user or the second user and a list of members of membership groups wherein at least one member's personal data matches that of the first user or the second user. In another embodiment of the invention, the communication system provides the user, using a graphical user interface, a preselection interface comprising a selector to permanently toggle a permission to automatically select a preselected user when the preselected user has specified matching personal data using the preselection interface.

BRIEF DESCRIPTION OF THE FIGURES

These and other characteristics of the present invention will be more fully understood by reference to the following detailed description in conjunction with the attached drawings, in which.

DETAILED DESCRIPTION

An illustrative embodiment of the present invention is a system which shows a user contacts that are nearby but protects those contacts' privacy by also listing contacts that are not nearby and disclosing proximity only after two users have each mutually selected the other from a list of users that is obfuscated by spuriously injected contacts. The spuriously injected other contacts are not geographically in close proximity, but may be displayed because they plausibly could be. In a preferred embodiment of the invention, the system detects that a user has moved and presents the user with a selection of contacts some of who are in the new location and some who are not in the new location. After the user selects contacts whom they would like to meet if they were close, the system notifies any selected contacts who are both selected and close to view another selection of users. If a notified contact also selects the original user, the system notifies both contacts that they are in the same location.

"Personal data", as utilized herein throughout, is defined as any data about a person that any person might prefer not to be publicly viewable everywhere by everyone. For example, personal data includes but is not limited to geographic location, availability, membership of a group, attendance at an event, or interests. "Matching personal data", as utilized herein throughout, is defined as an overlap or association between a plurality of persons' historical, current, or predicted future personal data to an extent and in categories predetermined by people or an algorithm. For example, person A and person B are currently within predetermined geographical proximity or on the same floor of the same building; person A and person B will be on the same flight; person A and person B will have 30 minutes overlap in availability later; person A and person B both attended the same conference; or person A and person B are currently nearby on the same floor of the same building and both conveniently available to speak. "Server", as utilized herein throughout, is defined as one or more of traditional servers and network-connected computer devices running software capable of self-organizing to provide similar functionality as a remote server.

FIGS. 1 through 5, wherein like parts are designated by like reference numerals throughout, illustrate an example embodiment or embodiments of methods that improve the functionality of a personal data sharing service system by protecting user privacy, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention. In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally to avoid obscuring the invention. It should be noted that there are many different and alternative configurations, devices and technologies to which the disclosed inventions may be applied. The full scope of the inventions is not limited to any examples or embodiments that are described below nor should any examples or embodiments be construed in any way as limiting the applications of the invention or the intention of the inventor in having the invention applied to any devices or systems whether presently existent or not.

Figure 1:
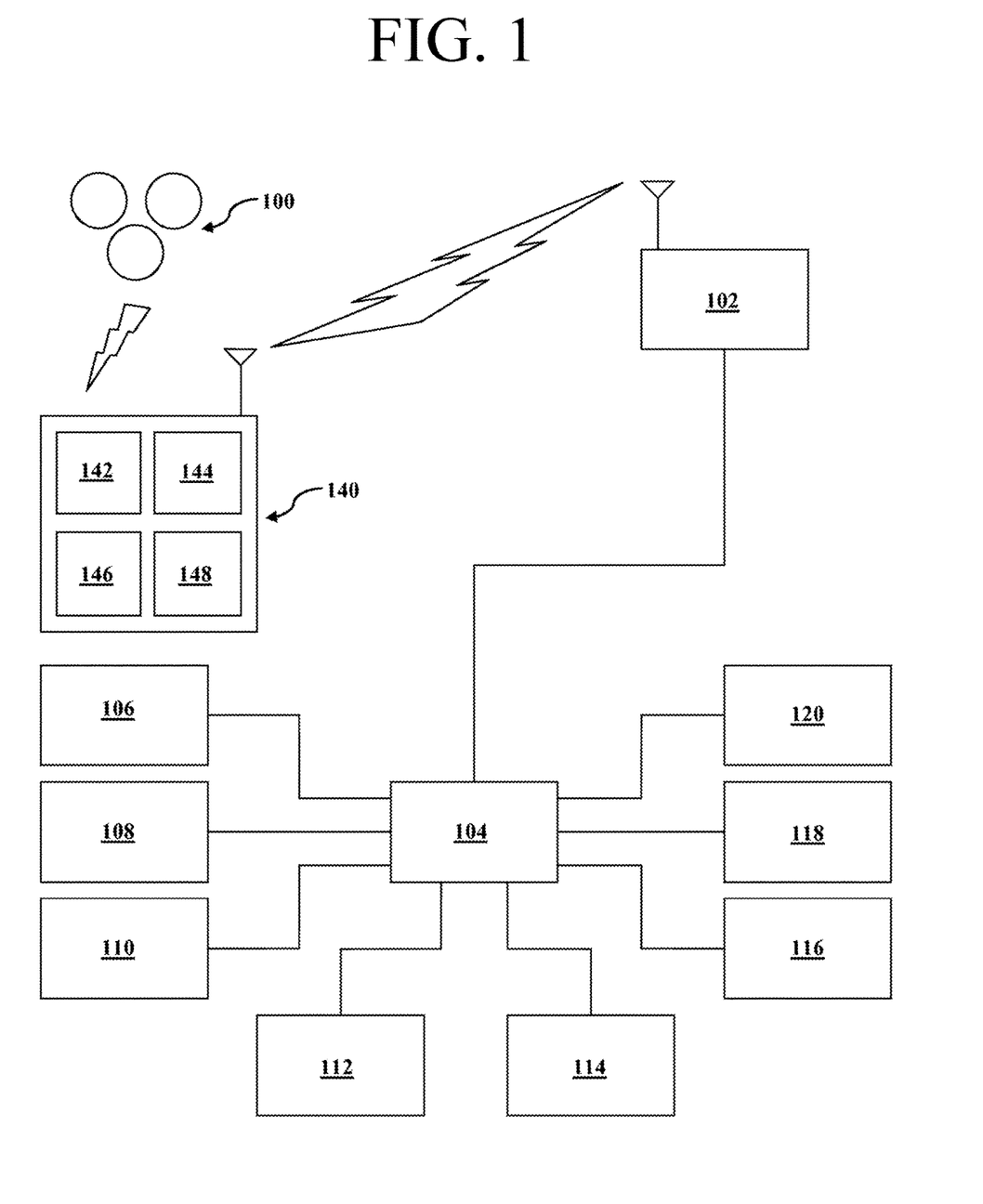
FIG. 1 is an illustrative representation of the physical components of an embodiment of the communication system.

FIG. 1 depicts an illustrative representation of the physical components of an embodiment of the communication system used to perform the method. GPS satellites 100 operate by communicating with a mobile device and measuring signals associated with a mobile device to determine the location of a mobile device 140 that in response has several features available based upon the location data. The mobile device 140 provides a user interface 142, GPS receiver 144, CPU and memory 146, and wireless communication component 148. Examples of mobile device 140 include cellular phones, smart watches, fitness trackers, personal digital assistants, pagers, laptop computers, automobile navigation systems, among others. Mobile device 140 receives GPS, wife, cell tower or other signals and determines its location. For purposes of illustration and without limitation, this may occur solely through one such signal, or may occur by using a filter to combine location data from multiple systems to obtain a more accurate location. The mobile device 140 is wirelessly coupled to an access point 102 with a built-in wireless communication component 148. The access point 102 is coupled to the Internet 104 or another network. Several other systems or services are available to the device over the Internet 104 or other network optionally including but not limited to a social network system 106, advertisement system 108, search engine 110, mapping, GIS, and routing database 112, user information and contacts database 114, advertiser information database 116, payment system 118, and phone system 120.

In some embodiments of the invention, a remote server periodically receives, and stores location information associated with a mobile device, such as a mobile phone. The information is sent from the mobile device; however, it may also be pulled from the mobile device, or obtained from another service that is able to determine the location of the mobile device (e.g., Location Based Services (LBS), Assisted GPS (A-GPS), eGPS, GSM Localization, Multilateralization, Radiolocation, Trilateration, Faux-GPS, Wi-Fi location, Bluetooth Low Energy, Ultra Wide-Band, etc.). The information includes not only geographic location data, but also the speed and the heading of the mobile device. If the speed and heading data is not collected or sent, then this information is determined by comparing subsequent data sets containing the mobile device's geographic information. The data sets are stored in a database and associated with a particular mobile device or a particular user.

The location information is obtained in real time from the device. For purposes of illustration and without limitation, the device may stream location information to the server, or send location information periodically such as every few seconds, or every few minutes. In alternative embodiments of the invention, the mobile device may record location information periodically to internal memory and periodically send the information to a remote server. In some embodiments of the invention, the user is able to select between streaming location information to the server and periodically sending recorded information. This selection may be made depending on current wireless signal conditions. For purposes of illustration and without limitation, if the mobile device is on a high speed data network such as LTE, EV-DO, HSDPA, Wi-MAX, or Wi-Fi, the device may elect to stream location information and possibly send a relatively large data packet of previously recorded location information. If the device is on a slower speed data network, then the location information may be sent less periodically, and more detailed records kept in internal memory on the phone that are sent to a remote server when a higher speed data connection is available. Alternatively, location information may be received from another service to which the mobile device is already reporting information.

The software that provides these methods runs on any mobile device or it may also run on a general-purpose computer. For purposes of illustration and without limitation, the software may run on iOS®, Android® devices or a personal computer running Windows®, OS Linux, or any other operating system. The software that runs on the device may run in the background (e.g., as a service, daemon, etc.), it may run as a script on a webpage, or it may run as an application in the operating system on the device.

In one illustrative embodiment of the invention, the location information may be stored and analyzed in any portion of the system and analyzed to determine the areas (such as a business, venue, city, region, or country) that the user of the mobile device is visiting or is likely to visit. For example, if the user is located at SFO airport and subsequently located at JFK airport, it is likely that the user is visiting New York City. The stored location information is compared to a database of areas visited by other users in order to determine specific areas likely to be visited by the user of the mobile device. For purposes of illustration and without limitation, in various embodiments of the invention, the information may be stored in the mobile device and analyzed on the mobile device providing maximum privacy; the information may be stored on a server remote from the mobile device and analyzed on the server remote from the mobile device; the information may be stored on the mobile device and analyzed on the remote server; the information may be stored on the remote server and analyzed on the mobile device; or the information may be written to a cryptographic blockchain shared between mobile devices. This may be done in one of several ways. For example when a mobile device location is within a predefined distance from either the address of an area, a geographic location associated with the area (such as latitude and longitude, or a latitude and longitude obtained from a geocoding algorithm), or a geometric perimeter of the area, it may be determined that the user of the mobile device is or will be at a specific area. Altitude data may also be analyzed to determine which floor of a multi-story building the user of the mobile device 140 is located in, or whether they are traveling by ground or air transport. The altitude data may be obtained from a pressure sensor, GPS receiver 144, or any other location determining hardware. An area may be user-defined; system defined; determined algorithmically, such as travel time-projection; or read from an online service, such as a social networking service or a Geographical Information Service such as OpenStreetMap.

In example embodiments of the invention, speed data is incorporated into the analysis. It may be determined that a user of a mobile device is at a particular area if, in addition to the reported location of the device, the speed of the mobile device is below a threshold level. For purposes of illustration and without limitation, if a user walks through a restaurant quickly, drives through a city, or flies over a country, it is not erroneously assumed that the user visited the particular area. Additionally, before assuming a user is visiting a certain area, a time requirement or pattern-of-movement requirement may be incorporated into the analysis. Before a determination is made as to whether the device is, or will be, present at a particular area it may be determined how long the device was present within the area. For purposes of illustration and without limitation, in some instances people quickly pass from an airport through the nearby city to get to a resort location further away. The geographic location and optional speed requirements previously discussed are imposed. Furthermore, one or both of these conditions may be required to persist for a threshold period. This threshold may be set by the system operator or may be dynamically determined by algorithms which are tuned by the operator or through Machine Learning as described below. This time may be the amount of time that a typical visitor spends at the particular area. This helps ensure that someone who walks by a business or through an area is able to be distinguished from someone that actually visits an area. These methods and associated systems may be used to determine the specific businesses or types of businesses a user of a mobile device visits. Alternatively, there may be a particular pattern of movement associated with someone who will stay in an area compared to someone who will pass through. Such patterns may be identified through machine learning, statistical analysis, or other techniques. For example, the system may use an algorithm or Machine Learning to analyze speed and heading data to predict the user's likely final location.

According to a preferred embodiment, a Machine Learning algorithm is based on neural networks, e.g. "feed-forward back-propagation neural networks". According to a further embodiment of the invention, genetic algorithms or other machine-learning approaches such as SVMs, Bayesian statistics, decision trees or other learning algorithms are applied to predict the user's destination given a set of starting parameters, in particular the starting time and location, or heading and speed data. Or these approaches may be applied to predict whether the time a user has spent at a location indicates they are likely to remain there given a set of starting parameters, in particular the user's historical, location, heading and speed data. The learning module, by training or re-training an existing machine learning algorithm on the trip history, generates a destination prediction algorithm whose prediction accuracy grows over time provided the user of the mobile device does not show a random or completely unsteady traveling behavior. The determination of the accuracy of the destination prediction algorithm depends on the machine learning approach applied. According to embodiments of the invention whose destination prediction algorithm is based on neural networks, the accuracy of the destination prediction algorithm is determined as the size of a mean-square error signal retrieved by comparing a predicted destination with the actual destination of a trip. The accuracy value of the prediction algorithm in combination with a probability value for a predicted destination is used by embodiments of the present invention to determine a prediction score. Said prediction score is used by the system for purposes of determining whether a plurality of users are or are likely to be nearby.

In some embodiments of the invention, the system predicts the user's final destination by access to the user's calendar or email and parsing records containing trip information. Alternatively, system may access information about travel to such area based on a database of contact activity or social media activity or other data. The system may compare any such information to a database of areas visited by other users in order to determine specific areas likely to be visited by the user of the mobile device by Machine Learning as described above, by statistical methods, or by a predictive algorithm. In some embodiments of the invention, the system may determine the user's location by looking up user's IP address in a geo-referenced IP address database or service. In some embodiments of the invention, the system may determine the location of user's contacts by connecting to the user's email, for example through a Gmail API, or a mail protocol such as POP, IMAP, or MAPI. After accessing or downloading user's mail, the system can extract the IP addresses from messages sent by user's contacts and look up those address in a geo-referenced IP address database or service. Additionally, the system may prioritize or group user's contacts by statistical or machine learning analysis of messages or message headers. For example, contacts with whom the user corresponds more frequently may be assigned to a close friends group.

In some embodiments of the invention, the system determines users who are connected by identifying entries matching to a predetermined extent in a plurality of users' data or data about users stored on servers or on user devices. For example, the system may be interfaced with one or many social networking services (e.g., Facebook, LinkedIn, Snapchat), or one or many communications services (e.g., Telegram, Signal, WeChat). A link may be established with the social networking or communications service in order to define a user's friends or contacts, provide location information, and determine permissions to view or share location information; this may be done through an API provided by the social networking or communications service. The link may established by the system operator or by a user after system presents options to link to social networks or communications services, through a message, a website, or a mobile device app. Alternatively, the system may provide its own address book in which a user maintains a list of their friends and any associated security settings or permission settings. Alternatively, the system may access a user's existing address book such as contacts stored on a mobile device, a remote computer, or a remote server. Alternatively, the system may access databases and lists on users' devices or servers to identify other affiliations in common such as school attended, membership in an organization, certifications, qualifications, having attended the same event, and having visited the same location. In each case, the user may be presented with permission options to enable or disable various levels of personal data sharing. In a preferred form of the invention, specific permissions need not be given in advance because the user will be assured that their privacy is protected through a double-opt-in system. Furthermore, in various embodiments of the invention, the location privacy settings may be configured from the social networking or communications service, from another app, from a website, from another portion of the system, or from within the mobile device itself.

By way of illustration, one potential embodiment of the invention matches users by reading a user's address book and extracting one or more unique identifiers such as telephone number, email address, instant messaging IDs. In addition, the system may verify unique identifiers of the first user such as telephone number, email address, instant messaging IDs, for example by sending an authentication message or call. If one user selects another contact whose unique identifier matches the that of another user of the service, the system will store that the first user has selected the second. If the second user similarly selects the first, the system will consider the users mutually approved.

In some embodiments of the invention, the system identifies whether users are connected by affiliations in common. For example, users may be in the same group or share an affiliation (e.g., members of Boston kite surfers, McKinsey alumni, attended MIT) on social networking websites or other listings of group membership. Or they may self-associate with a list of groups maintained by the system, by user devices, or by servers. Alternatively, the system may allow designated, self-selected, or elected administrators specify, manage, and edit group membership. In a preferred form of the invention, organizations are able to certify and update a list of group members to a central server (e.g., McKinsey alumni). In some embodiments of the invention, the system may accredit users as members of a group based on location information. For example, if a user's location is within the perimeter of the Vancouver Convention Center for at least 50% of the time while the TED conference is taking place there, the system may assign user to the "TED Attendees" group.

Figure 2:
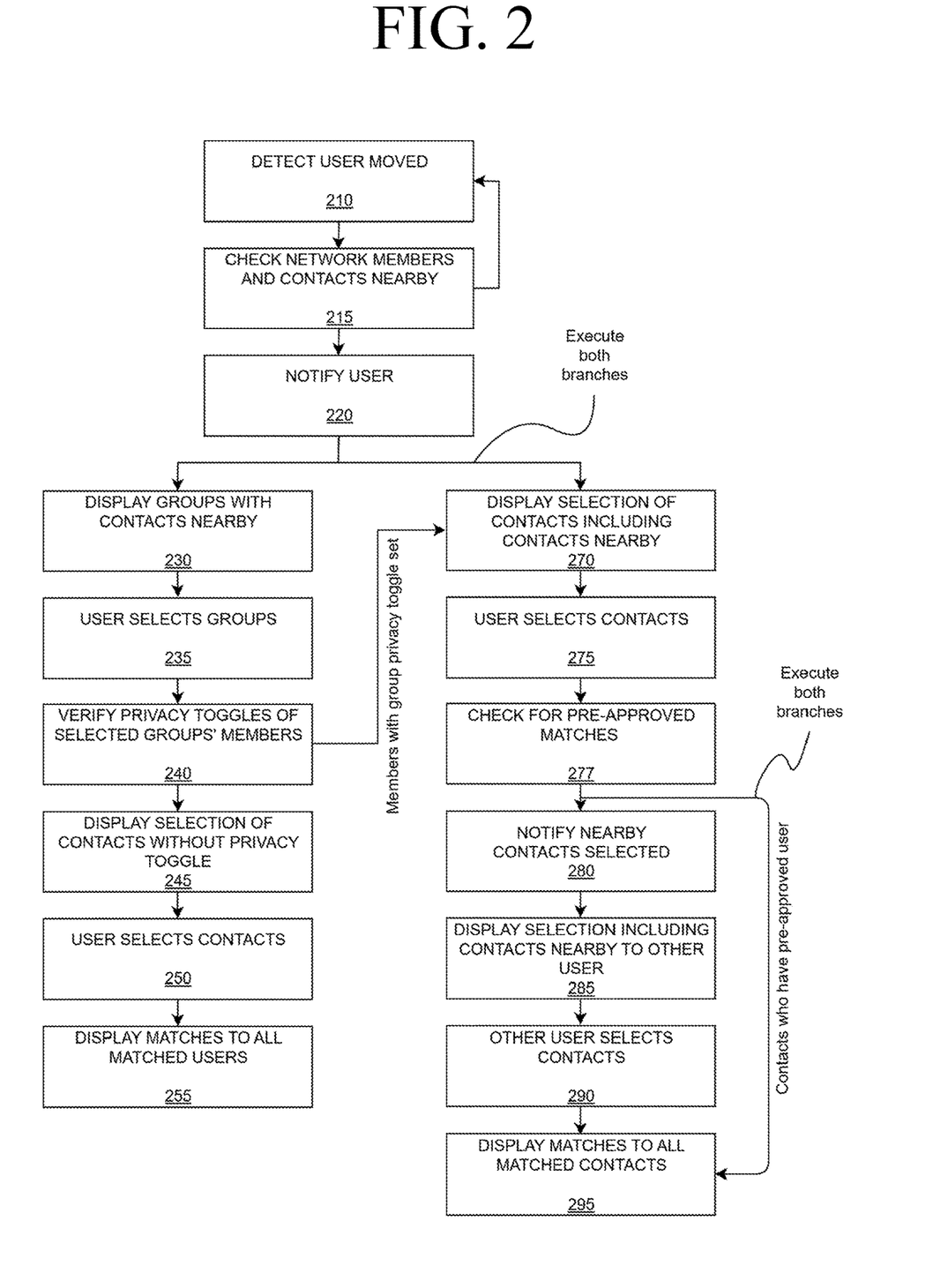
FIG. 2 is an illustrative flow chart detailing relevant steps of the method.

FIG. 2 depicts an illustrative flow chart detailing relevant steps of the method. After the system detects that a user has entered or will enter a new area 210, it checks to see whether any other users connected in one or more of the embodiments described above are in or will enter the same area 215. The system may perform this step on a central server or through a distributed system by utilizing, for example, cryptographic hashes on a blockchain.

The system notifies such user through an electronic message (e.g., text message, email) or through a notification to open an application or webpage on one or more of their mobile devices and computing devices 220. The notifications may be sent to the device by way of any protocol whether currently existing or yet to be created via any communication method. The notifications may be sent over any communication system or protocol including but not limited to TCP or UDP protocols, Short Messaging Service (SMS), Multimedia Messaging Services (MMS), email, Instant Message (IM) protocols (e.g., AIM, MSN, Jabber, Google Talk, etc.), Extensible Messaging and Presence Protocol (XMPP), Extensible Markup Language (XML), Real Simple Syndication (RSS), or Web technologies such as AJAX.

In the message or upon user opening an application or webpage, the system may display to user the names of any groups of which such user is a member which have one or more members who are in the same area 230. In the same or different message, or upon user opening an application or webpage, the system may display to user any contacts with whom such user is connected who are in the same area 270 mixed, randomly or otherwise, along with spurious other contacts with whom such user is connected who are not in the same area. Alternatively, the system may display to user any members of any groups of which such user is a member who are in the same area 270 mixed, randomly or otherwise, along with spurious other members of the same group and who are not in the same area. The system may select such spurious contacts who are likely to travel to such area based on a database of contact activity, member data, social media activity, or other data.

Proximity between selected contacts may be recalculated when the system detects that any one selected contact has moved. Proximity may be calculated on a contact-to-contact basis or by using a grouping algorithm which divides a map into preselected areas such as hexagons. Alternatively, the system may adopt established procedures for reducing the computational complexity by calculating proximity at algorithmically-determined intervals.

The display 230 may comprise, for example, a screen listing group names, descriptions, or associated logos or photographs with a means for user to select and deselect the groups whose members they may be interested in seeing while they are in such area 235. This may be accomplished by, for example, a checkbox next to each group which user may check or uncheck, the group or surrounding button changing color when selected, or a swipe interface where each group is swiped left or right on a common page (such as messages in Apple's Mail mobile app) or on individual pages (such as on the Tinder mobile app).

The display 270 may comprise, for example, a screen listing contact names along with profile photographs with a means for user to select and deselect the contacts whom they may be interested in seeing while they are in such area 275. This may be accomplished by, for example, a checkbox next to each contact name which user may check or uncheck, the name or surrounding button changing color when selected, or a swipe interface where each contact is swiped left or right on a common page. The system checks whether any newly-selected contacts had previously selected the user 277 and if so displays matches to all matched contacts 295.

The displays 230 and 270 and selection interfaces 235 and 275 may be presented sequentially, or together, or integrated in a single page.

The system determines group matches wherein a plurality of members of a group who are in the same area have all selected that group in step 235 or otherwise selected such group (e.g., permanently toggling to share location information when in the same area as members of such group) and verifies whether any matched group members have set a privacy toggle for that group 240. Should any matched members have a privacy toggle set for that group, the system protects their privacy by first displaying them to the user alongside other spurious contacts 270. The system may display matched members with the privacy toggle unset for that group to user 245, and then only notify selected 250 users. For any groups where the user has the privacy toggle unset for that group, the system may immediately after verifying privacy toggles 240 notify all such matches to all matched users 255. In some implementations, such notification may occur through an electronic message or through a notification to open an application or webpage on their mobile device.

If user selects contacts 275 who are in the same area who had not previously selected the user, system notifies those selected contacts 280, again displaying contacts actually in the area alongside spurious contacts 285. In one implementation of the system, a system-determined or user-determined limit may apply to such notifications (e.g., no more than daily).

The system determines user matches wherein two users who are in or will be in the same area have both selected each other in 275 and 290 or otherwise selected each other (e.g., permanently toggling to share location information when in the same area as a contact) and notifies all such matches to all matched users 295. In some implementations, such notification may occur through an electronic message or through a notification to open an application or webpage on their mobile device.

Figure 3:
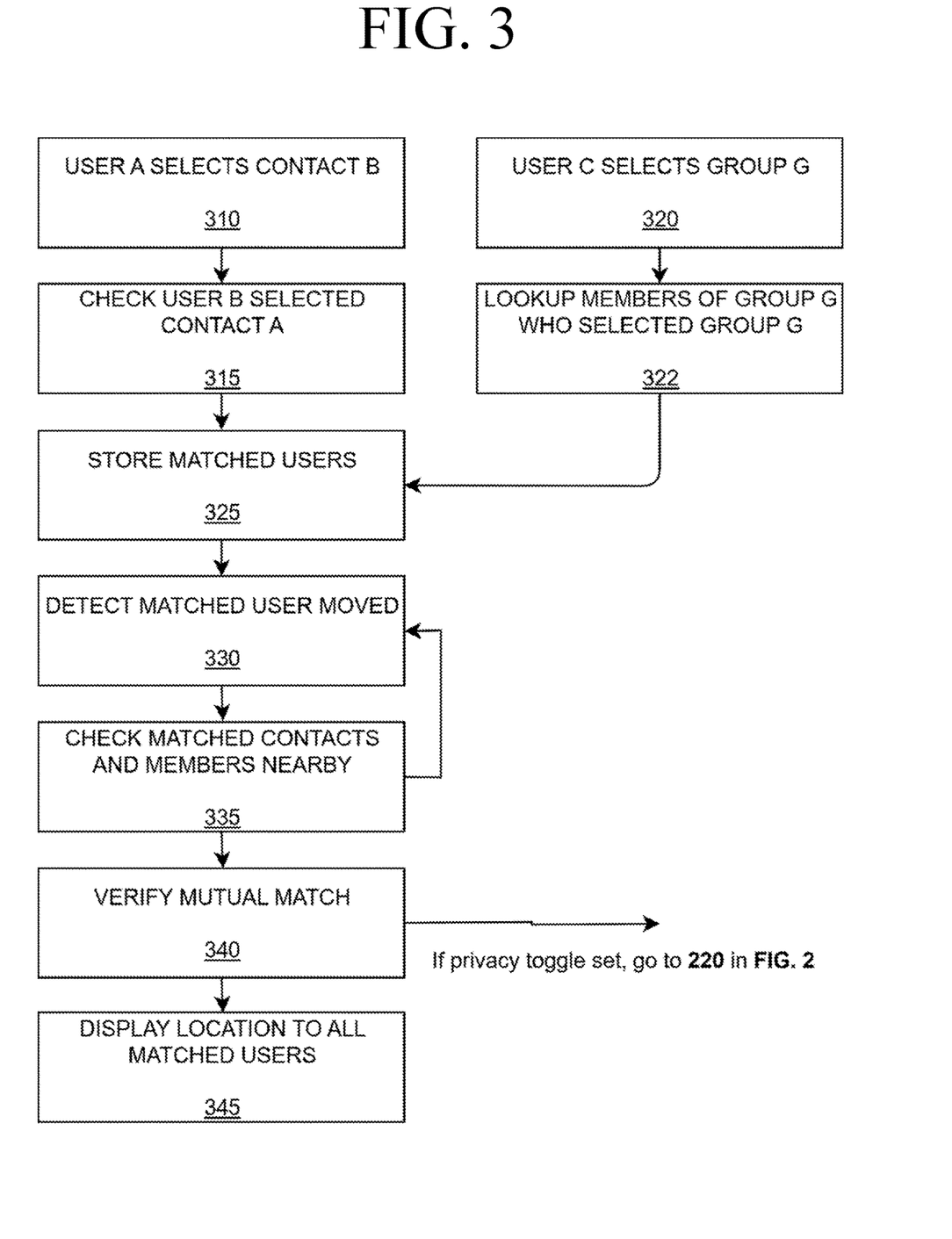
FIG. 3 is an illustrative flow chart detailing relevant steps of an embodiment of the method.

FIG. 3 depicts an illustrative flow chart detailing relevant steps of an example embodiment where proximity notifications can occur without user intervention. A user "A" selects a user "B" 310 either from a contact list such as an address book or a list of users on a social networking platform. The system identifies matched users by matching unique identifiers such as cellphone number, email address, or user ID. If the system verifies that user "B" previously selected user "A" 315, the system stores A and B as matched users 325. At the same time, a user "C" may select a group "G" 320 whereupon the system checks for other members of group "G" who also selected that group 322 and stores such users and user "C" as matched users 325. When the system detects that any matched user has moved 330, it checks whether any matched contacts are within a predetermined distance or within a defined area 335. If matched contacts are nearby, the system verifies that that the other contact has still selected the user as a matched contact 340. If both contacts are still mutually matched, the system notifies both contacts that they are nearby or within the defined area 345.

In an alternative embodiment, the system may offer a user-selectable option not to automatically notify the stationary contact that the user has moved. At step 340 where the system ensures a mutual match still exists, it also checks whether the moved user's movement privacy protection toggle is set. If it is, the system may first display the matched contacts only to the moved user, or the system may follow the privacy-protecting method of FIG. 2, starting at step 220.

In an example embodiment, the system may display within an app on the user's mobile device an aggregate, anonymized, representation of the number of the user's contacts and the numbers of members of each of user's network who are within the same area. For example, the display may read, "35 members of the TED network are nearby".

In an example embodiment, the system may allow users to select intersections of groups. For example, step 215 would check for other nearby users who are members of both group G and group F, or who are members of group G and not group F.

In an example embodiment, the system may offer additional privacy protection by not displaying contacts nearby 270 unless there exist enough contacts who are not nearby but plausibly could be that can be spuriously injected into the displayed list.

In an example embodiment, the mobile device may be connected to an Augmented Reality or Virtual Reality display, which allows the system to display groups with nearby contacts 230 or contacts including nearby contacts 270 overlaid on user's view of their environment. In an example embodiment, the system may track the user's gaze or eye movements. For example, paying attention to one particular contact more than others may trigger selection of that contact 275.

Figure 4:
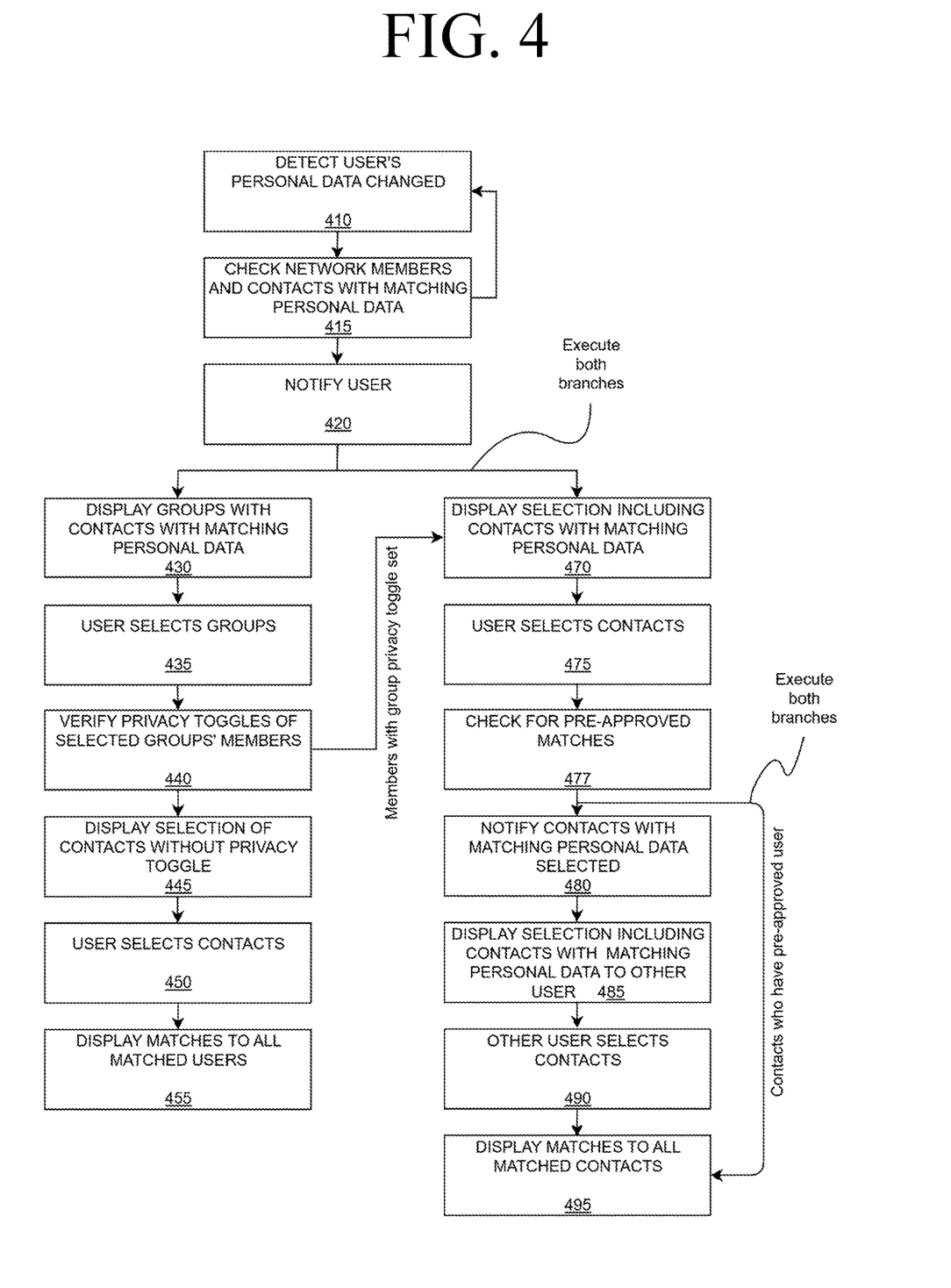
FIG. 4 is an illustrative flow chart detailing relevant steps of the general method.

FIG. 4 depicts an illustrative flow chart detailing relevant steps of the general method. After the system detects that a user's personal data has or will change 410, it checks to see whether any other users connected in one or more of the embodiments described above have matching personal data 415. The system may perform this step on a central server or through a distributed system by utilizing, for example, cryptographic hashes on a blockchain.

In an example embodiment, the personal data detected may be the user's availability to conveniently speak. This may be determined using sensors of a user's mobile device (for example, the GPS sensor indicates that the user is moving, and the accelerometer sensors indicate that the user is not running), usage-monitoring software on a user's computing device (for example, the device operating system or a driver installed on the operating system may report that the user is not on a phone call or that the user is not typing), or availability status declared by connected users.

The system notifies such user through an electronic message or through a notification to open an application or webpage on one or more of their computer devices 420 as described above.

In the message or upon user opening an application or webpage, the system may display to user the names of any groups of which such user is a member which have one or more members with matching personal data 430. In the same or different message, or upon user opening an application or webpage, the system may display to user any contacts with whom such user is connected with matching personal data 470 mixed, randomly or otherwise, along with spurious other contacts with whom such user is connected who do not have matching personal data. Alternatively, the system may display to user any members of any groups of which such user is a member who have matching personal data 470 mixed, randomly or otherwise, along with spurious members of the same group and who do not have matching personal data. The system may select such spurious contacts or members who are likely to have matching personal data based on a database of contact activity, member data, social media activity, or other data.

Matching of personal data of selected contacts may be recalculated when the system detects that any one selected contact's personal data has changed. Matching personal data may be calculated on an individual basis or by using a grouping algorithm which divides the multi-dimensional data space into regions. Alternatively, the system may adopt established procedures for reducing the computational complexity by calculating matching at algorithmically-determined intervals.

The display 430 may comprise, for example, a screen listing group names, descriptions, or associated logos or photographs with a means for user to select and deselect the groups whose members they may be interested in contacting while have matching personal data 435. This may be accomplished by, for example, a checkbox next to each group which user may check or uncheck, the group or surrounding button changing color when selected, or a swipe interface where each group is swiped left or right on a common page or on individual pages.

The display 470 may comprise, for example, a screen listing contact names along with profile photographs with a means for user to select and deselect the contacts whom they may be interested in contacting while they have matching personal data 475. This may be accomplished by, for example, a checkbox next to each contact name which user may check or uncheck, the name or surrounding button changing color when selected, or a swipe interface where each contact is swiped left or right on a common page. The system checks whether any newly-selected contacts had previously selected the user 477 and if so displays matches to all matched contacts 495.

The displays 430 and 470 and selection interfaces 435 and 475 may be presented sequentially, or together, or integrated in a single page.

The system determines group matches wherein a plurality of members of a group who have matching personal data have all selected that group in step 435 or otherwise selected such group (e.g., permanently toggling to share personal data when having matching personal data with members of such group) and verifies whether any matched group members have set a privacy toggle for that group 440. Should any matched members have a privacy toggle set for that group, the system protects their privacy by first displaying them to the user alongside other spurious contacts 470. The system may display matched members with the privacy toggle unset for that group to user 445, and then only notify selected 450 users. For any groups where the user has the privacy toggle unset for that group, the system may immediately after verifying privacy toggles 440 notify all such matches to all matched users 455. In some implementations, such notification may occur through an electronic message or through a notification to open an application or webpage on their computing device.

If user selects contacts 475 with matching personal data who had not previously selected the user, system notifies those selected contacts 480, now displaying to each contact a selection of contact's contacts with matching personal data alongside spurious contact's contacts without matching personal data 485. In one implementation of the system, a system-determined or user-determined limit may apply to such notifications (e.g., no more than daily).

The system determines user matches wherein two users with matching personal data have both selected each other in 475 and 490 or otherwise selected each other (e.g., permanently toggling to share personal data when having matching personal data with a contact) and notifies all such matches to all matched users 495. In some implementations, such notification may occur through an electronic message or through a notification to open an application or webpage on one or more of their mobile devices and computing devices.

Figure 5:
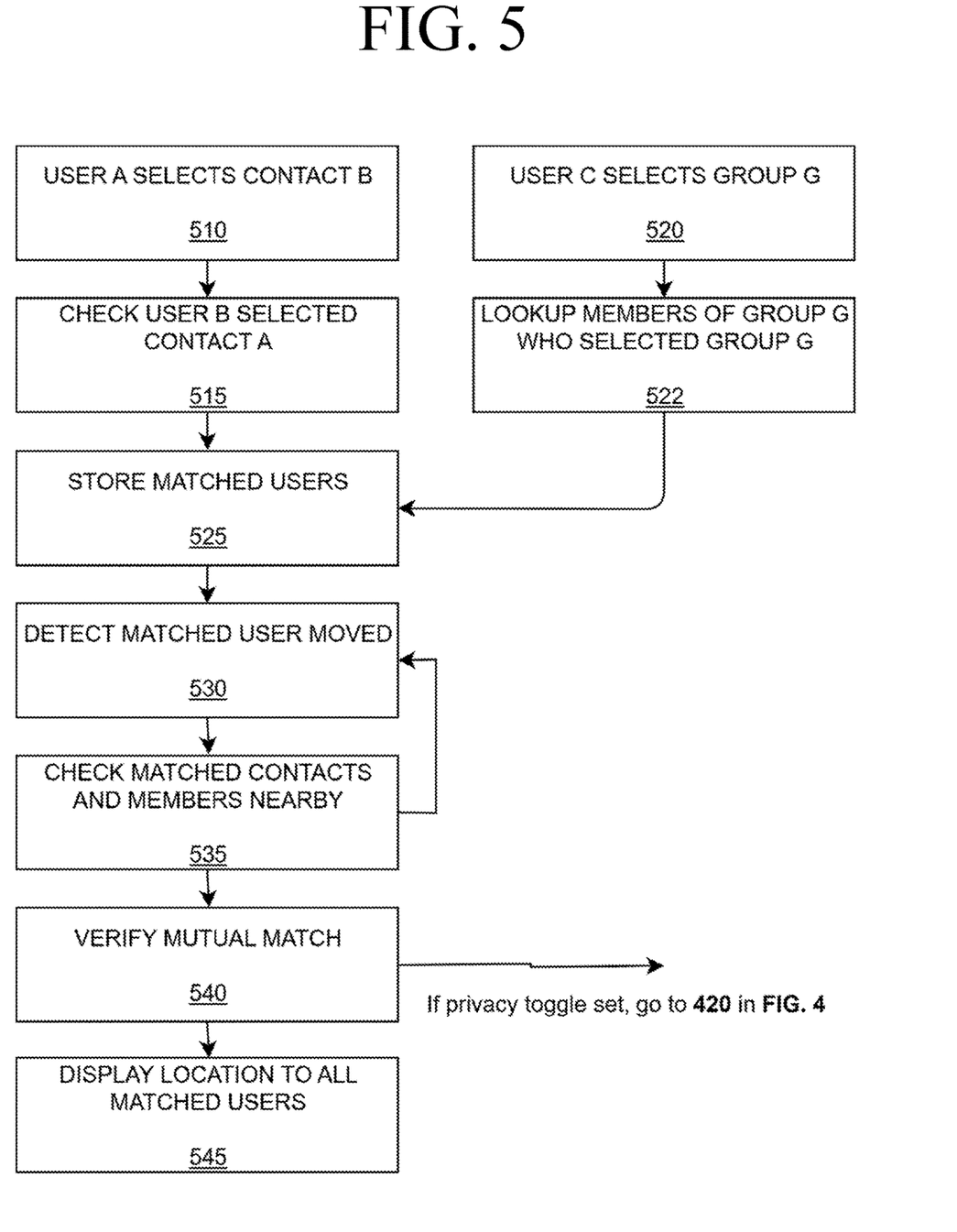
FIG. 5 is an illustrative flow chart detailing relevant steps of an embodiment of the general method.

FIG. 5 depicts an illustrative flow chart detailing relevant steps of an example general embodiment where matching personal data notifications can occur without user intervention. A user "A" selects a user "B" 510 either from a contact list such as an address book or a list of users on a social networking platform. The system identifies matched users by matching unique identifiers such as cellphone number, email address, or user ID. If the system verifies that user "B" previously selected user "A" 515, the system stores A and B as matched users 525. At the same time, a user "C" may select a group "G" 520 whereupon the system checks for other members of group "G" who also selected that group 522 and stores such users and user "C" as matched users 525. When the system detects that any matched user's personal data has changed 530, it checks whether any matched contacts have matching personal data 535. If matched contacts have matching personal data, the system verifies that that the other contact has still selected the user as a matched contact 540. If both contacts are still mutually matched, the system notifies both contacts that they have matching personal data 545.

In an alternative embodiment, the system may offer a user-selectable option not to automatically notify the contact whose personal data has not changed that the user's personal data has changed. At step 540 where the system ensures a mutual match still exists, it also checks whether the user with changed personal data's privacy protection toggle is set. If it is, the system may first display the matched contacts only to the user, or the system may follow the privacy-protecting method of FIG. 4, starting at step 420.

In an example embodiment, the system may display within an app or webpage on the user's computing device an aggregate, anonymized, representation of the number of the user's contacts and the numbers of members of each of user's network with matching personal data. For example, the display may read, "35 members of the TED network are currently available".

In an example embodiment, the system may allow users to select intersections of groups. For example, step 415 would check for other users with matching personal data who are members of group G and group F, or who are members of group G and not group F.

In an example embodiment, the system may offer additional privacy protection by not displaying contacts with matching personal data 470 unless there exist enough contacts without matching personal data but who plausibly could have matching personal data that can be spuriously injected into the displayed list.

In an example embodiment, the computing device may be connected to an Augmented Reality or Virtual Reality display, which allows the system to display groups with contacts with matching personal data 430 or contacts including contacts with matching personal data 470 overlaid on user's view of their environment. In an example embodiment, the system may track the user's gaze or eye movements. For example, paying attention to one particular contact more than others may trigger selection of that contact 475.

Figure 6:
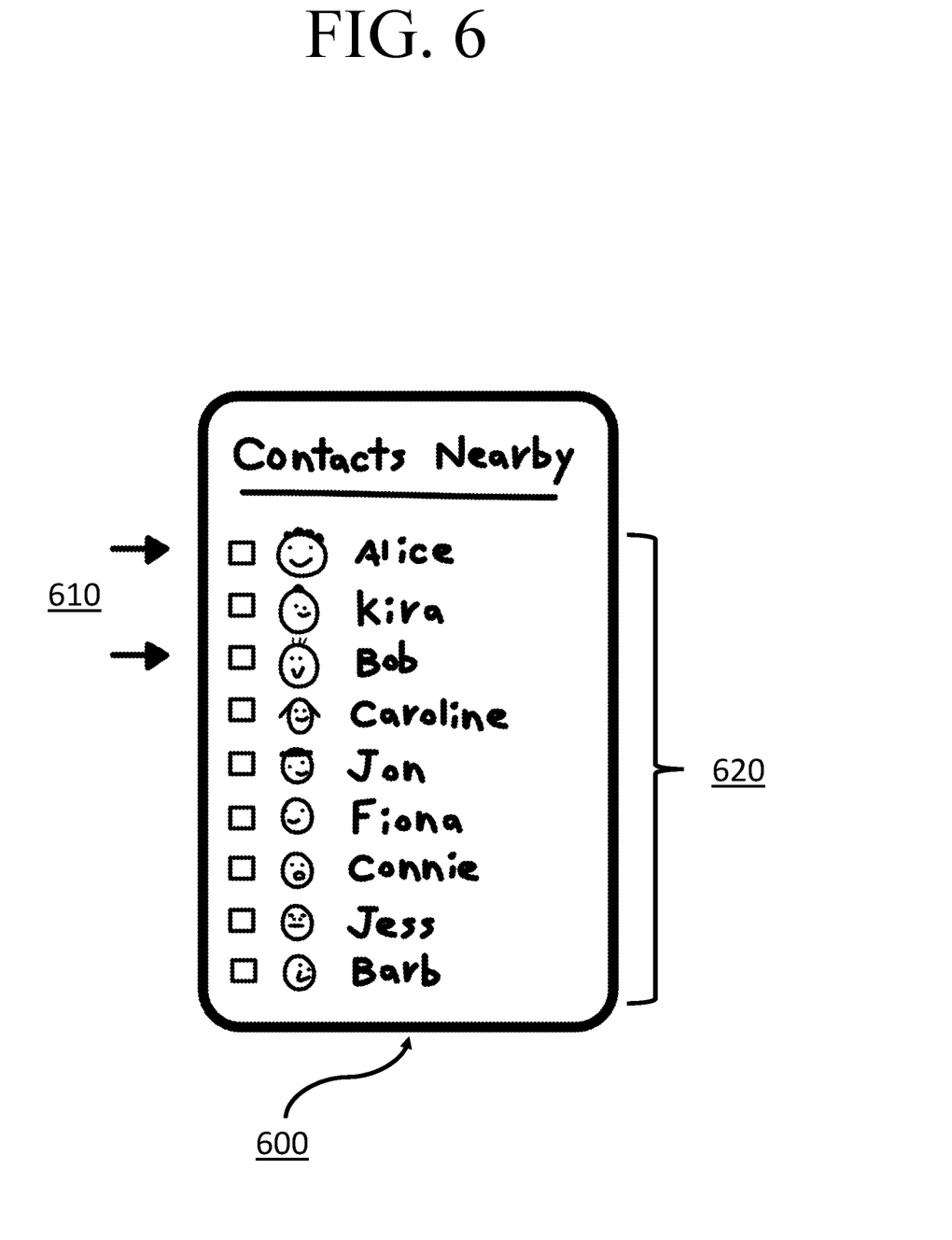
FIG. 6 is an illustrative representation of the obfuscated list presented to a user.

FIG. 6 depicts an illustrative representation of the obfuscated list presented to a user, for example on the screen of a smartphone connected to the Internet through a mobile data network 600. The list comprises contact names along with profile photographs with a means for user to select and deselect the contacts whom they may be interested in seeing. The system displays two contacts, Alice and Bob, to whom the user is connected and who are in the same area 610. The system also displays seven other contacts with whom the user is connected but who are not in the same area (620 excluding 610). The list is mixed randomly so that it is non-ordered and non-identifiable, and the user is unable to identify which contacts are actually nearby. In this way, Alice's and Bob's privacy are protected.

The inventive methods and systems may be used on a variety of different mobile devices and computing devices such as small or simple cellphones, smart phones, Apple's iPhone, UMPC computers, wristwatches, laptop computers, car navigation systems, fitness trackers, wearable health accessories, or any other computerized device. Therefore, there are a variety of different user interfaces that may be implemented when used on mobile devices and computing devices of varying capabilities and screen sizes.

As those skilled in the art will appreciate, many aspects of the invention, and the various embodiments of the invention, can beneficially be practiced alone and need not be coupled together. Unless specifically stated otherwise, no aspect of the invention should be construed as requiring combination with another aspect of the invention in practice. However, those skilled in the art will also appreciate that the aspects of the invention may be combined in any way imaginable to yield one of the various embodiments of this invention. For purposes of illustration and without limitation, one embodiment of the invention may consist only of personal data reporting features while another form of the invention may comprise personal data reporting features and double opt-in features and while yet another form of the invention does not include personal data reporting features but includes any one or more of the other features discussed above.

To any extent utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about" and "approximately" are intended to cover variations that may existing in the upper and lower limits of the ranges of subjective or objective values, such as variations in properties, parameters, sizes, and dimensions. In one non-limiting example, the terms "about" and "approximately" mean at, or plus 10 percent or less, or minus 10 percent or less. In one non-limiting example, the terms "about" and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

CONCLUSION, RAMIFICATIONS, AND SCOPE

Thus the reader will see that at least one embodiment of the invention provides for the first time a personal data-sharing service that would give even extremely busy or successful individuals the confidence to use it without giving up privacy, divulging their personal data to anyone they that they don't approve of seeing it at that time and in that place.

What is claimed is:

1. A method comprising the following steps:
   a. reading one or more data records, each referencing at least one of {users and other persons};
   b. identifying, responsive to the reading, connected users wherein any of the users is connected to any other of the users, and, optionally, connected persons wherein any of the users is connected to any of the other persons;
   c. reading personal data of the connected users and/or receiving updates comprising personal data of the connected users;
   d. comparing the personal data of a first user (User1) and the personal data of at least one of the connected users connected to the User1;
   e. identifying, responsive to the comparing, matching users wherein the personal data of the User1 partially or completely matches the personal data of one or more of the connected users connected to the User1;
   f. adding, responsive to the identifying, at least one of the matching users to a MatchingList1;
   g. creating a NonMatchingList1 of elements chosen from at least one of: {the connected users connected to the User1 and the connected persons connected to the User1}, optionally exclusive of the MatchingList1;
   h. transmitting an electronic communication to the User1;
   i. presenting to the User1, responsive to the transmitting, an ObfuscationList1 comprising one or more elements from the MatchingList1 mixed indistinguishably with one or more elements from the NonMatchingList1, wherein the User1 is unable to identify which elements in the ObfuscationList1 came from the MatchingList1 and which came from the NonMatchingList1;
   j. receiving, from the User1, an electronic communication comprising a selection of zero or more elements from the ObfuscationList1;
   k. performing, for each of one or more of the matching users in the selection, at least one operation chosen from: {repeating one or more of the preceding steps, identifying that the matching user pre-approved the User1, and identifying that the matching user pre-approved an affiliation in common with the User1};
   l. identifying, responsive to the performing, mutually-selected users;
   m. transmitting one or more electronic communications to one or more of the mutually-selected users: the receiving users; and
   n. presenting, responsive to the transmitting, to at least one receiving user an identifying attribute of at least one of their mutually-selected users.

2. The method of claim 1, wherein the updates of comprising personal data are received from, and the electronic communications are delivered to and received from, mobile devices equipped with network interfaces communicatively coupled to each other.

3. The method of claim 2, wherein the mobile devices are communicatively coupled to each other through a server, and the method is repeated iteratively based upon the updates comprising personal data received from the mobile devices received at the server.

4. The method of claim 2, wherein the electronic communications are at least one of: {an electronic message, text message, email, a notification to open an application, and a notification to open a webpage}.

5. The method of claim 1, wherein the personal data comprises at least one of: {geographic location information, whether the user is currently traveling, and any information that at least one of the users would prefer to share only selectively}.

6. The method of claim 5, wherein whether the personal data partially or completely matches is specified by at least one filter chosen from: {user input, input from a user-selectable geographic radius, an algorithm determining relative proximity thresholds between users, latitude and longitude obtained from a geocoding algorithm, a predefined distance from an address of an area, a predefined distance from a geographic location associated with an area using latitude and longitude, and a geometric perimeter of an area}.

7. The method of claim 1, wherein the comparing the personal data of the connected users is responsive to processing of references to the future from at least one of: {calendars, email, a database of contact activity, and social media activity}.

8. The method of claim 1, wherein the identifying connected users comprises processing at least one of: {address books, contact lists, and data received through social networks APIs}.

9. The method of claim 1, wherein:
a. the data records comprise affiliations of the users and/or the other persons;
b. the identifying the connected users comprises identifying affiliations in common; and
c. optionally, the identifying the connected persons comprises identifying affiliations in common.

10. A system comprising:
at least one processor; and
a computer readable storage medium comprising instructions that, when executed by the at least one processor, cause the system to:
a. read one or more data records, each referencing at least one of {users and other persons};
b. identify, responsive to the reading, connected users wherein any of the users is connected to any other of the users, and optionally connected persons wherein any of the users is connected to any of the other persons;
c. read personal data of the connected users and/or receive updates comprising personal data of the connected users;
d. compare the personal data of a first user (User1) and the personal data of at least one of the connected users connected to the User1;
e. identify, responsive to the comparing, matching users wherein the personal data of the User1 partially or completely matches the personal data of one or more of the connected users connected to the User1;
f. add, responsive to the identifying, at least one of the matching users to a MatchingList1;
g. create a NonMatchingList1 of elements chosen from at least one of: {the connected users connected to the User1 and the connected persons connected to the User1}, optionally exclusive of the MatchingList1;
h. transmit an electronic communication to the User1;
i. present to the User1, responsive to the transmitting, an ObfuscationList1 comprising one or more elements from the MatchingList1 mixed indistinguishably with one or more elements from the NonMatchingList1, wherein the User1 is unable to identify which elements in the ObfuscationList1 came from the MatchingList1 and which came from the NonMatchingList1;
j. receive, from the User1, an electronic communication comprising a selection of zero or more elements from the ObfuscationList1;
k. perform, for each of one or more of the matching users in the selection, at least one operation chosen from: {repeat one or more of the preceding steps, identify that the matching user pre-approved the User1, and identify that the matching user pre-approved an affiliation in common with the User1};
l. identify, responsive to the performing, mutually-selected users;
m. transmit one or more electronic communications to one or more of the mutually-selected users: the receiving users; and
n. present, responsive to the transmitting, to at least one receiving user an identifying attribute of at least one of their mutually-selected users.

11. The system of claim 10, wherein the updates of comprising personal data are received from, and the electronic communications are delivered to and received from, mobile devices equipped with network interfaces communicatively coupled to each other.

12. The system of claim 11, wherein the mobile devices are communicatively coupled to each other through a server, and the method is repeated iteratively based upon the updates comprising personal data received from the mobile devices received at the server.

13. The system of claim 10, wherein the personal data comprises at least one of: {geographic location information, whether the user is currently traveling, and any information that at least one of the users would prefer to share only selectively}.

14. The system of claim 13, wherein whether the personal data partially or completely matches is specified by at least one filter chosen from: {user input, input from a user-selectable geographic radius, an algorithm determining relative proximity thresholds between users, latitude and longitude obtained from a geocoding algorithm, a predefined distance from an address of an area, a predefined distance from a geographic location associated with an area using latitude and longitude, and a geometric perimeter of an area}.

15. The system of claim 10, wherein the comparing the personal data of the connected users is responsive to processing of references to the future from at least one of: {calendars, email, a database of contact activity, and social media activity}.

16. The system of claim 10, wherein the identifying connected users comprises processing at least one of: {address books, contact lists, and data received through social networks APIs}.

17. The system of claim 10, wherein:
a. the data records comprise affiliations of the users and/or the other persons;
b. the identifying the connected users comprises identifying affiliations in common; and
c. optionally, the identifying the connected persons comprises identifying affiliations in common.

* * * * *